United States Patent [19]

Schluep et al.

[11] Patent Number: 4,606,099

[45] Date of Patent: Aug. 19, 1986

[54] METHOD AND APPARATUS FOR MANUFACTURING AN ARMOR SHUTTER

[75] Inventors: René Schluep, Tobel; Franz Buser, Buckten, both of Switzerland

[73] Assignee: Griesser AG, Switzerland

[21] Appl. No.: 590,700

[22] Filed: Mar. 19, 1984

[30] Foreign Application Priority Data

Mar. 24, 1983 [CH] Switzerland ........................ 1625/83

[51] Int. Cl.[4] ........................................ B23P 19/04

[52] U.S. Cl. ........................................ 29/24.5

[58] Field of Search ........................................ 29/24.5

[56] References Cited

U.S. PATENT DOCUMENTS 2,827,686 3/1958 Adelman ............................ 29/24.5
2,917,810 12/1959 Wilson ............................ 29/24.5
4,073,044 2/1978 Edixhoven ............................ 29/24.5

*Primary Examiner*—Howard N. Goldberg
*Assistant Examiner*—Steven Nichols
*Attorney, Agent, or Firm*—McGlew and Tuttle

[57] ABSTRACT

The method starts with bringing the stack of slats to be assembled into a standby position. The slats are then removed from the bottom of the magazine and stepwise provided with connecting elements having hooks which are then engaged with loops provided on carrier strips of the shutter. Thereupon, the hooks are bent to close and the slats are moved downwardly by steps. After suspending the last slat, the carrier strips are cut through above the last slat, so that on a conveyor provided below, the assembled shutter forms a stack to be removed. This process is continuous, so that in immediate succession, the assemblage of a further shutter begins.

8 Claims, 11 Drawing Figures

METHOD AND APPARATUS FOR MANUFACTURING AN ARMOR SHUTTER

FIELD AND BACKGROUND OF THE INVENTION

This invention relates in general to the construction of venetian blinds and in particular to a new and useful method and apparatus for assembling individual slats into an armor shutter.

There are known methods of this kind in which the slats are fed from a magazine of an inserting device where the connecting elements provided with a catch for the loops of carrier strips are to be secured to the beaded edges of the slats. Upon a usually manual removal of the slats which are provided with connecting elements, the slats are assembled to shutters in a separate apparatus, by suspending the loops of the carrier strips from the corresponding portions of the connecting elements. This method of manufacturing is complicated and time consuming and requires much space, particularly if the slatted armor shutter is to be broad, such as several meters.

SUMMARY OF THE INVENTION

The present invention is directed to a method and device, permitting the manufacture of a shutter starting from finished slats, in a single continuous operation and in one and the same apparatus, which makes it possible to provide suitable control means, save space, and avoid any manual intervention and change of equipment.

In accordance with the method of the invention, a slatted armor shutter is manufactured by arranging the slats which have beads at end in a vertical stack, removing individual slats from the vertical stack into a support position where they are held firmly, introducing connecting elements from each side of the beaded edges of the slats as they are held individually, interengage one connecting element with the other, moving the slats by steps downwardly corresponding to the spacing of the carrier strip loops which is desired until the last slat to be assembled reaches a cutting station, cutting the carrier band through at a distance above the slat and letting the slat drop into a new stack of a desired number with the assembled band.

With the invention, a slat is connected to a connecting element which includes a rear hook portion which is bendable into a securing loop and a front slat penetrating brad portion which is driven into the bead of the slat. A blind slat band is engaged through the openings of a holder part of a carrier strip which has a loop portion which is engageable in the hook portion of the connecting element. Advantageously the connecting element is applied first and mounted so that its hook portion will engage the loop portion of the carrier strip as it is moved downwardly and means are then provided for closing the hook portion into a loop so that the two parts become interengaged.

The individual tools and conveying means provided at the various stations within a vertically extended enclosure may be actuated hydraulically, for example, and a program control may be provided for this operation. It is advisable to associate the various working stations with monitoring elements which are connected to the control, and to interrupt the manufacturing process if erroneous operations appear.

Accordingly, it is an object of the invention to provide an improved assembly apparatus for assembling individual slats into an armor shutter.

A further object of the invention is to provide an apparatus for assembling the carrier strip connecting element to a beaded portion of each slat in a carrier strip to the connecting element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 5:
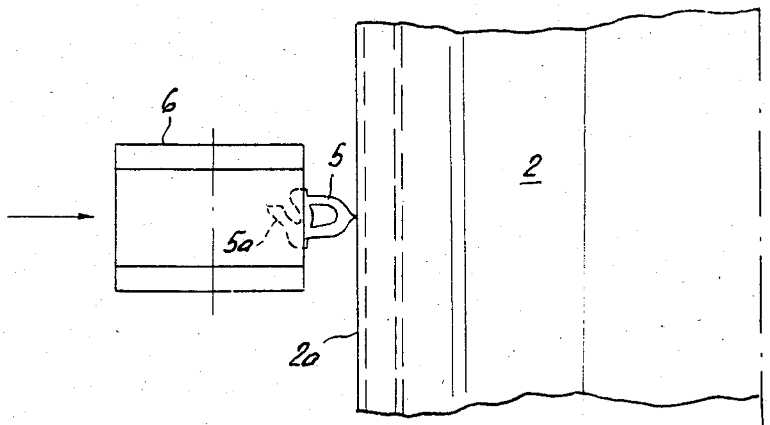

Referring to the drawings in particular the invention embodied therein comprises an apparatus and method for manufacturing a slatted armor shutter in which individual slats 2 having a bead portion **2*a* at each end are assembled to a slat carrier strip connecting element 5 which includes a rear hook portion 5*a* which is bendable into a securing loop and a front slat penetrating brad portion which is engageable into the slat bead portion 2*a* as shown in FIG. 5**.

The drawing shows a magazine 1 accommodating a stack of horizontally superposed slats 2 having beaded edges (which protrude inwardly in the stack). The lowermost slat 2 in this stack reposes on rollers 3 which are transversely extensible and retractable by means of a fluid pressure operated piston device **3*a*. Below rollers 3, parting elements 4 are provided which also are extensible and retractable by means of piston devices 4*a***.

Laterally, yet within the enclosure of the apparatus, extending downwardly of the magazine 1, clamps 6 are provided into which connecting elements 5 can be introduced by means of a feeder (not shown) and which are actuable by means of a piston device **6*a*. The clamps can be moved back and forth by means of another piston device 6*b*, to drive connecting elements 5 into the beaded edge of the slat. This receiving station is associated with a supporting mechanism 8 which is movable by means of a piston device 8***a* transversely to or above the central space of the enclosure, and which comprises a section gripper 7 vertically displaceable by means of another piston device 7*a*.

Below supporting mechanism 8 are conveyance means for feeding in carrier strips 9 which are provided with loops 9*a* and are run in the enclosure downwardly on each side past a central fastening station. At this fastening station, suspension clamps 11 are provided which are actuable by piston devices 11*a* and associated each with a pusher 10 which is intended for bending the hook portions 5*a* of the connecting elements 5. The pusher 10 is actuable by means of still another piston device 10*a*. Below this fastening station, strip advancing clamps 12 are provided which are actuable by piston device 12*a* and vertically displaceable by another piston device 12*b*.

Clamping heads 13 are provided below strip advancing clamps 12, which are actuable by piston devices 13*a* and are supplied with connecting clamps. Below clamping heads 13, strip cutters 14 are provided which are actuable by piston devices 14*a* and extensible and retractable through another piston device 14*b*. In the downwardly adjacent space of the enclosure, a gripping device 15 equipped with a suction gripper for the slats is provided which can be moved by a piston device 15*a* transversely into and out of a standby position in the enclosure and is actuable by means of another piston device 15*b*. At the lower end of the enclosure, a conveying device 17 is provided for receiving and further displacing the finished armor shutter 16.

The various piston devices, for which also other actuating devices may be substituted, may be operated hydraulically or pneumatically. It is advisable to connect a further control, so that they perform their operation in a predetermined programmed cycle, optically monitoring elements may be associated with each operating step which follow the individual steps and interrupt the cycle if an error is detected.

Figure 2:
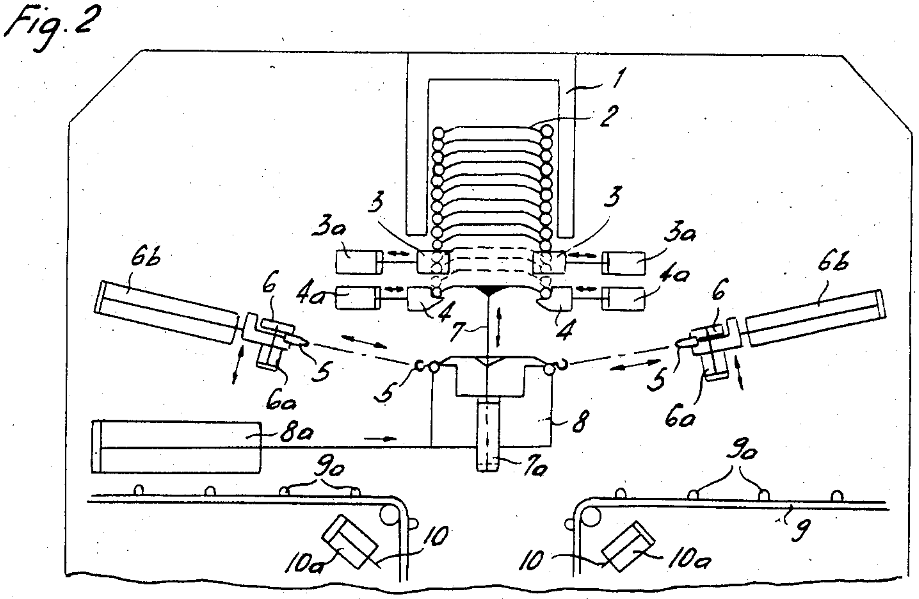
FIGS. 2 and 3 show the receiving station of the apparatus.

With the just described apparatus, the inventive method may be carried out as follows:

As soon as, with rollers 3 extended into their working position, slats 2 are introduced into magazine 1, parting elements 4 are extended, the rollers 3 are retracted so that the stack drops to parting elements 4. Support 8 is then moved into its working position and suction gripper 7 is moved up close below the lowermost slat 2 of the stack. Upon a following retraction of parting elements 4, the stack drops on suction gripper 7 (FIG. 2). Now, parting elements 4 are extended again, so that they engage between the lowermost and the superjacent slat 2 of the stack, thus separating the two slats. Suction gripper 7 is then retracted, so that the lowermost slat supported thereon comes into the receiving station of support 8.

Figure 4:
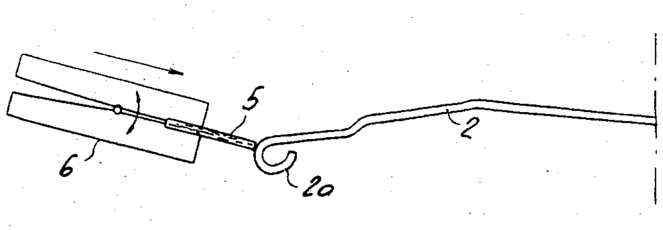
FIGS. 4 and 5 are enlarged side and top plan views respectively illustrating the driving of the connecting elements into the beaded edge of a slat.

As better shown in FIGS. 4 and 5, in this station, the clamps 6 each carrying a connecting element 5 and slightly inclined downwardly to be directed against the respective beaded edge 2*a* of a slat 2, are pushed forward so that connecting elements 5, each provided with a point, are driven through the outer wall of the associated bead 2*a* and firmly fixed therein. The open hook 5*a* of the connecting element 5, which reamins projecting from the beaded edge, then extends in a plane approximately parallel to that of the slat.

Figure 1:
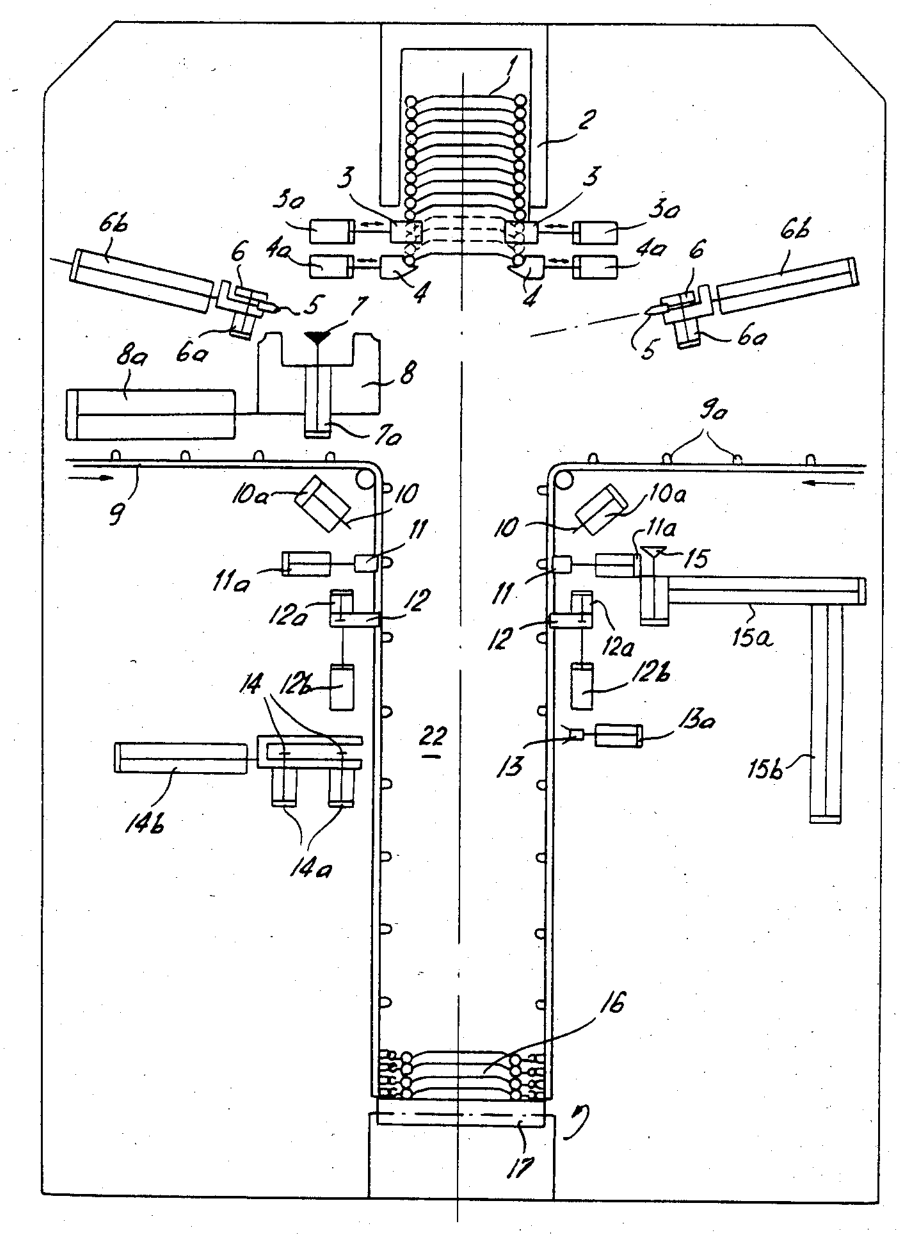
FIG. 1 is a schematic front view of the apparatus comprising various working units.
Figure 3:
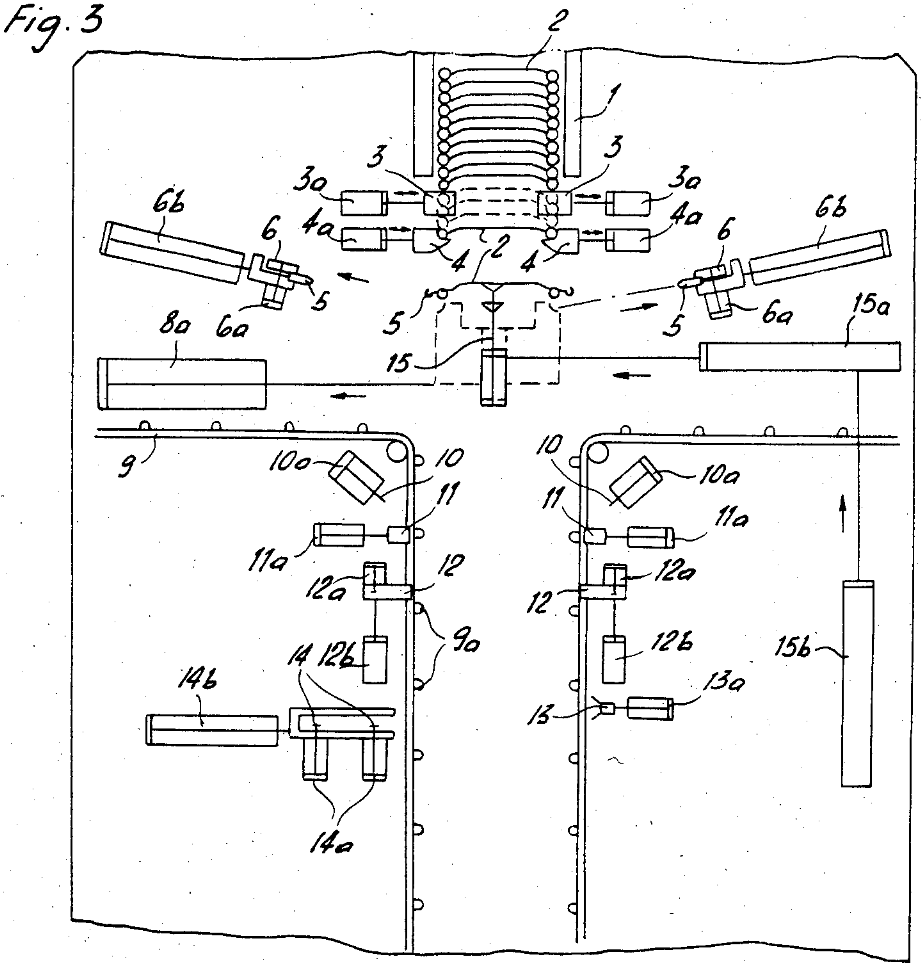
Figure 6:
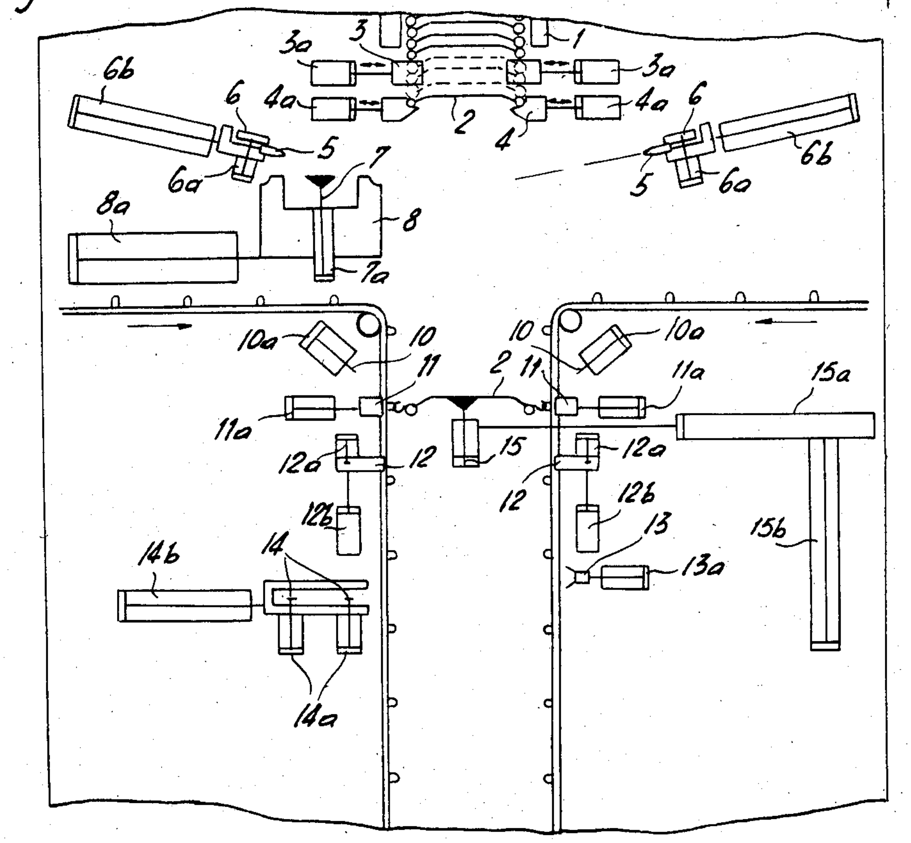
FIG. 6 shows the operation of a fastening station of the apparatus.

After the empty clamps 6 retract, (to receive a new connecting element 5), the gripping device 15 is moved to the center of the enclosure and the suction gripper thereof is extended upwardly until it applies against the slat 2 held by support 8 (FIG. 3). This lifts slat 2 clear of the receiving station in support 8 so that support 8 can be moved back to its position as shown in FIG. 1 or 6.

Figure 7:
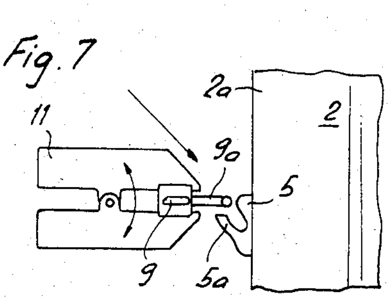
FIGS. 7 and 8 are enlarged top plan views showing the engaging of the loops and closing of the hooks in the fastening station.
Figure 8:
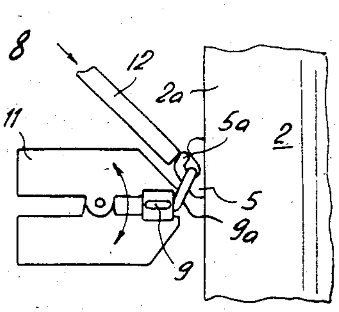
Figure 9:
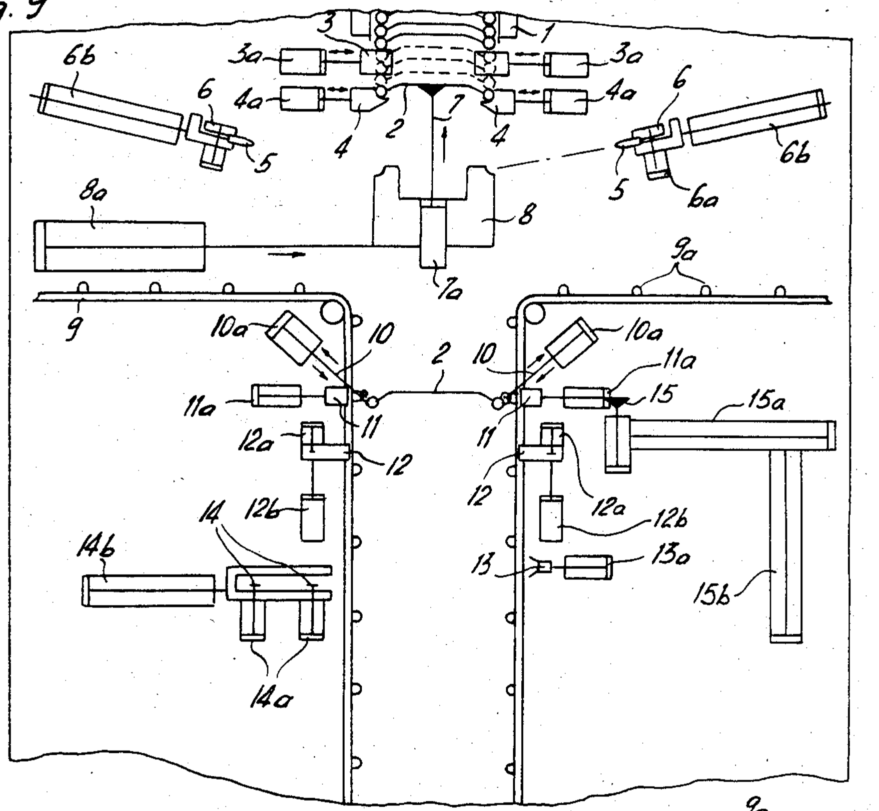
FIG. 9 illustrates the operation of both the receiving and the fastening stations, terminating with the closing of the hooks.
Figure 10:
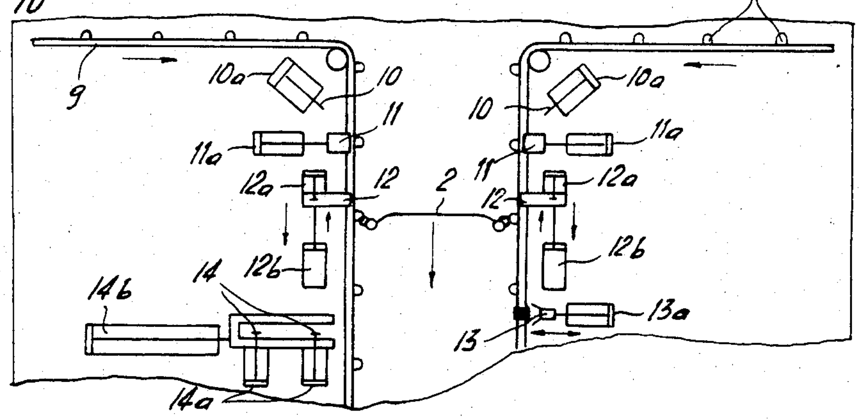
FIG. 10 illustrates the further displacement of the slats, after the hooks have been closed, and stacking of the finished armor shutter ready for removal.

It will be understood that support 8 and gripping device 15 are spaced from each other in the longitudinal direction of the slat. Suction gripper 7 of support 8 is disengaged from the slat and moved back into its initial position laterally of the enclosure center along with support 8. The suction gripper of gripping device 15, now holding the slat, is then retracted downwardly (FIG. 6) until the slat 2 provided with connecting elements 5 comes into the zone of suspension clamps 11 (FIG. 7). Upon extending suspension clamps 11, and engaging loops 9*a* of carrier strip 9 to open hooks 5*a* (by correspondingly moving the clamp in the plane of the slat), the pushers 10 (FIGS. 8 and 9) are actuated, whereby hooks 5*a* are bent to close and trop loops 9*a*. The slat is now suspended from carrier strips 9 and the gripper of gripper device 15 can be lowered and moved into its initial position off the center of the enclosure (FIG. 9). Simultaneously, with the bending of hooks 5*a* and the retraction of gripping device 15, the next slat 2 is separated in the described manner in magazine 1 from the stack and moved into the receiving station, where the same cycle is repeated. As to the first slat 2, now suspended from strips 9, the advance clamps 12 now become effective (FIG. 10) and convey this slat along with the carrier strips 9, downwardly through a step corresponding to the spacing of the carrier strips loop portions 9*a* on the strips 9. In this new position, advance clamps 12 oepn and are moved back into their initial position by piston device 12*b*.

Figure 11:
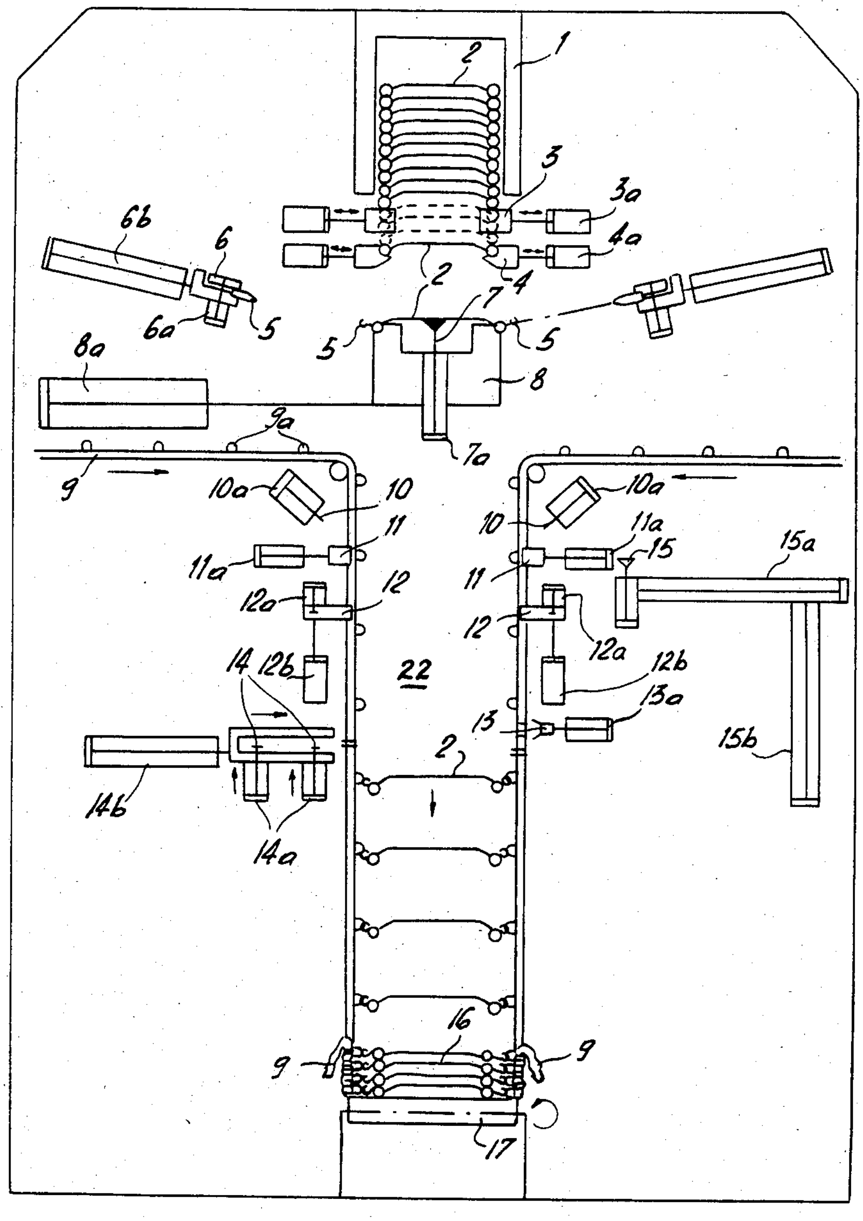
FIG. 11 is a schematic view similar to FIG. 1 showing part of the complete apparatus.

In the just described manner, all the slats to be assembled to an armor shutter are moved from the magazine and conveyed downwardly. The lowermost slat thus reaches the conveying device 17 where, as soon as the last slat of the assembled shutter have arrived, a stack 16 is formed. As this happens, i.e. when the last slat is moved by advance clamps 12 from the hook bending position through a step downwardly and the advance clamp 12 is returned into its initial position, clamps 12 are moved again to engage strips 9. Now, by means of clamping head 13, the usual connecting clamp (now shown) is fitted onto the carrier strip 9. Then, cutters 14 are actuated and the strips are cut through between the uppermost slat of the assembled shutter and the connecting clamps (FIG. 11). This causes all of those slats which are still at more elevated locations within the central space 22 of the enclosure and which are suspended from the stips, to drop onto the stack 16 which is then removed by conveying device 17 which moves the stack 16 in a direction out of the plane of FIG. 11. Since above the cut location of cutters 14, the working cycle continues in the described manner, a new stack of slats and strips starts to form on the conveying device. FIG. 11 schematically shows how the gripping device 15 is positioned in a manner that is clear of the slats 2 and the stack 16.

This makes possible the fully automatic assemblage. The apparatus does not require much space, since the height of the needed enclosure is small. None of the needed operations is manual, and since the operations follow each other, continuously, no transfer to different locations is necessary.

In the above example, the connecting elements are provided with hooks into which, after the connecting elements 5 are driven into the beaded edge 22, the loops of the carrier strips 9 are engaged. It is possible of course, first to engage, for example, U-shaped connecting elements into the loops, and only then drive the two legs of the U into the beads. This can be done in the same working station. Other connecting elements may have hooks formed thereon in such a way that upon engaging the loops of the strip on the hook already driven into the bead, no bending of the hook is necessary.

While a specific embodiment of the invention has been shown and described in detail to illustrate the application of the principles of the invention, it will be understood that the invention may be embodied otherwise without departing from such principles.

What is claimed is:

1. A method of manufacturing a slatted armor shutter in which slats with beaded edges are connected to each other by carrier strips which are provided with loops to be engaged on connecting elements inserted in the beaded edges of the slats, comprising arranging the slats in horizontal, superadjacent position into a vertical stack, removing the slats therefrom individually starting from below and moving them in parallel position downwardly into a receiving station, holding the slats firmly in the receiving station, introducing connecting elements from the side into the beaded edges of each slat as it is held, at a fastening station interengaging the connecting elements with loops which are provided on the carrier strips which are fed in by pairs vertically donwwardly, moving each slat by steps corresponding to the spacing of the loops on the carrier strips downwardly while it is held until the last slat to be assembled into the armor shutter has left the fastening station and has reached a cutting station, cutting the carrier strip through at the cutting station a distance above the last slat, and letting the last slat also drop onto a stack already formed in a supporting area of the slats fixed to the cut portions of the carrier strips.

2. A method according to claim 1, including, after inserting the connecting elements into the beaded edges, moving each slat provided with the connecting elements individually downwardly into the fastening station which is provided between the carrier strips into a zone of two loops which are provided on the carrier strips, suspending the loops from hooks which are provided on the connecting elements, and then bending the hooks to close them.

3. A method of assembling individual slats into an armor shutter using slats which have bead portions at each end and a slat carrier strip connecting element which includes a rear hook portion which is bendable into a securing loop and a front slat penetrating brad portion which is engageable into the slat bead portion and a blind slat band which is engaged through openings of a holder part of a carrier strip which has a loop portion engageable in the hook portion of the connecting element, comprising arranging the slats into a vertical stack, removing each slat in succession from the bottom of the stack and positioning it on a support, driving a brad into each beaded portion of a slat, moving the slat with the brad through a path between conveyors carrying the carrier strip at spaced locations so that its loop portion intercepts the hook portion of the connecting element, bending the hook portion of the connecting element so that it forms a closed loop connected to the loop of the carrier strip, assembling the band into the openings of the carrier strip and accumulating a plurality of the slats in a finished vertical stack.

4. A method according to claim 3, wherein a carrier strip is assembled to a connecting element by bending the hook portion after it is engaged into the loop of the carrier strip and only then is the brad driven into the feed portion at each end of the slat.

5. An assembly apparatus for assembling individual slats having a beaded portion at each end to a slat carrier strip connecting element which includes a rear hook portion which is bendable into a securing loop and a front slat penetrating brad portion which is engageable into the slat bead portion of said blind slat and a carrier strip having an opening for receiving a band and a loop portion which is engageable in the hook portion of the connecting element, comprising means for arranging the slats into a vertical stack, a slat support mounted for movement to a position underlying said stack and to a position out of alignment with said stack, means for separating a slat from the stack and delivering it onto the support when the support is aligned below said stack, clamp holding means carrying the carrier strip connecting element engageable from each side of said support to force connecting element brad portion into the slat bead portion, supporting means below said support including a member which is extendable outwardly to hold the slat with the carrier strip connecting element in the bead portions and to move it downwardly through a downward path, conveyor means along said downward path carrying a plurality of spaced apart carrier strips which are positioned with the loop portions arranged to engage over the hook portion of each connecting element by said conveyor, means along said downward path for closing said hook portion into a loop to interengage said connecting element and said carrier strip and a clamping head located alongside said downward path engageable with said carrier strip while a band is fit into the openings thereof and to drop the slats into a second vertical stack.

6. An assembly apparatus according to claim 5, including a second conveyor for transporting a second stack of slats in a direction away from said downward path, said supporting means including a fluid pressure operated piston having a support surface which is movable with said piston, means connected to said piston to move it laterally into and out of the downward path and a band cutter located along said downward path substantially in alignment with said support of said piston.

7. An assembly apparatus according to claim 6, including means along said downward path monitoring the operation.

8. An assembly apparatus according to claim 6, wherein the support surface includes a suction device engageable with each slat, said clamp means including elements which clamp and hold said connecting element while said carrier strip is aligned there with its loop portion over the hook portion, and means for moving said clamp with said connecting element to engage the slat penetrating brad portion into the slat beads.

* * * * *